US012627457B2

(12) United States Patent
Liang et al.

(10) Patent No.: US 12,627,457 B2
(45) Date of Patent: May 12, 2026

(54) BANDWIDTH PART ACTIVATION OR DEACTIVATION METHOD, SIDELINK CONNECTION RELEASE METHOD, AND DEVICE

(71) Applicant: VIVO MOBILE COMMUNICATION CO., LTD., Dongguan (CN)

(72) Inventors: Jing Liang, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 348 days.

(21) Appl. No.: 17/874,769

(22) Filed: Jul. 27, 2022

(65) Prior Publication Data

US 2022/0360421 A1     Nov. 10, 2022

Related U.S. Application Data

(63) Continuation of application No. PCT/CN2021/076488, filed on Feb. 10, 2021.

(30) Foreign Application Priority Data

Feb. 13, 2020    (CN) .......................... 202010091504.4

(51) Int. Cl.
*H04L 5/00*        (2006.01)
*H04W 76/30*      (2018.01)

(52) U.S. Cl.
CPC ........... *H04L 5/0098* (2013.01); *H04W 76/30* (2018.02)

(58) Field of Classification Search
CPC .............................. H04L 5/0098; H04W 76/30
See application file for complete search history.

(56) References Cited

U.S. PATENT DOCUMENTS

2017/0325119 A1    11/2017   Lee et al.
2019/0357215 A1*   11/2019   Zhou ................. H04W 72/0453
                             (Continued)

FOREIGN PATENT DOCUMENTS

CN          109429341 A     3/2019
CN          109788553 A     5/2019
CN          110611954 A     12/2019
CN          110662202 A     1/2020
WO      WO-2020027635 A1    2/2020

OTHER PUBLICATIONS

International Search Report and Written Opinion of the International Searching Authority regarding International Patent Application No. PCT/CN2021/076488, dated May 11, 2021. Translation provided by Bohui Intellectual Property.

(Continued)

*Primary Examiner* — Jael M Ulysse
(74) *Attorney, Agent, or Firm* — Harness, Dickey & Pierce, 1P.L.C.

(57)            ABSTRACT

A bandwidth part activation or deactivation method includes: determining to activate or deactivate an SL BWP according to one of following: configuration information of a Uu BWP and configuration information of the SL BWP; or receipt of an activation or deactivation indication sent by a network side device or a peer terminal, or receipt of activation or deactivation confirmation information sent by the network side device or the peer terminal, where the activation or deactivation confirmation information is feedback information of an activation or deactivation request sent by the network side device or the peer terminal for the terminal.

13 Claims, 6 Drawing Sheets

(56)                References Cited

U.S. PATENT DOCUMENTS

| | | | | |
|---|---|---|---|---|
| 2020/0008183 | A1 | 1/2020 | Chen et al. | |
| 2020/0045674 | A1* | 2/2020 | Tseng | H04W 76/14 |
| 2020/0053799 | A1* | 2/2020 | Jeon | H04L 5/0048 |
| 2020/0235896 | A1* | 7/2020 | Lee | H04L 5/001 |
| 2020/0259627 | A1* | 8/2020 | Loehr | H04L 5/0098 |
| 2020/0322939 | A1* | 10/2020 | Cao | H04W 72/02 |
| 2020/0358584 | A1* | 11/2020 | Baldemair | H04L 5/0098 |
| 2021/0168814 | A1* | 6/2021 | Chen | H04W 4/46 |
| 2021/0212099 | A1* | 7/2021 | Yi | H04W 72/23 |
| 2021/0227465 | A1* | 7/2021 | Kung | H04W 76/28 |
| 2021/0235403 | A1 | 7/2021 | Lee et al. | |
| 2021/0274545 | A1* | 9/2021 | Adjakple | H04W 72/21 |
| 2022/0053551 | A1* | 2/2022 | Ko | H04W 4/40 |
| 2022/0201742 | A1* | 6/2022 | Zhao | H04W 72/23 |
| 2022/0209899 | A1* | 6/2022 | Lee | H04L 1/1671 |
| 2022/0232537 | A1* | 7/2022 | Seo | H04L 5/0053 |
| 2022/0338244 | A1* | 10/2022 | Ko | H04W 4/40 |
| 2022/0346011 | A1* | 10/2022 | Hong | H04W 52/02 |
| 2022/0394810 | A1* | 12/2022 | Hong | H04W 72/23 |
| 2024/0121066 | A1* | 4/2024 | Loehr | H04L 1/1642 |

OTHER PUBLICATIONS

First Office Action regarding Chinese Patent Application No. 202010091504.4, dated Dec. 30, 2021. Translation provided by Bohui Intellectual Property.

Second Office Action regarding Chinese Patent Application No. 202010091504.4, dated Jun. 20, 2022. Translation provided by Bohui Intellectual Property.

"Physical layer structure for NR sidelink," vivo, 3GPP TSG RAN WG1 #96bis Meeting, R1-1904072, dated Apr. 12, 2019.

"Left issues on failure case handling for NR V2X," OPPO, 3GPP TSG-RAN WG2 Meeting #108, R2-1914466, dated Nov. 22, 2019.

"SL and UL BWP Numerology Mismatch," Lenovo, Motorola Mobility, 3GPP TSG RAN WG2 Meeting #106, R2-1907152 was R2-1904458, dated May 17, 2019.

"RRC triggered BWP activation and initial BWP configuration," Huawei, HiSilicon, 3GPP TSG-RAN2 Meeting #102, R2-1807461, dated May 25, 2018.

Lenovo et al., "SL and UL BWP Numerology Mismatch," Document R2-1910441 (was R2-1907152, R2-1904458), 3GPP TSG RAN WG2 Meeting #107, Aug. 26-30, 2019.

Vivo, "Physical Layer Structure for NR Sidelink," Document R1-1908148, 3GPP TSG RAN WG1 Meeting #98, Aug. 26-30, 2019.

Extended European Search Report regarding European Patent Application 21753898.2, dated Sep. 14, 2023.

First Office Action regarding Korean Patent Application No. 10-2022-7030164, dated Jul. 22, 2024. Translation provided by Bohui Intellectual Property.

Office Action regarding European Patent No. 21753898.2, dated Jul. 1, 2025.

"Medium Access Control (MAC) protocol specification (Release 15)," 3GPP TS 38.321 v15.4.0, dated Dec. 2018.

* cited by examiner

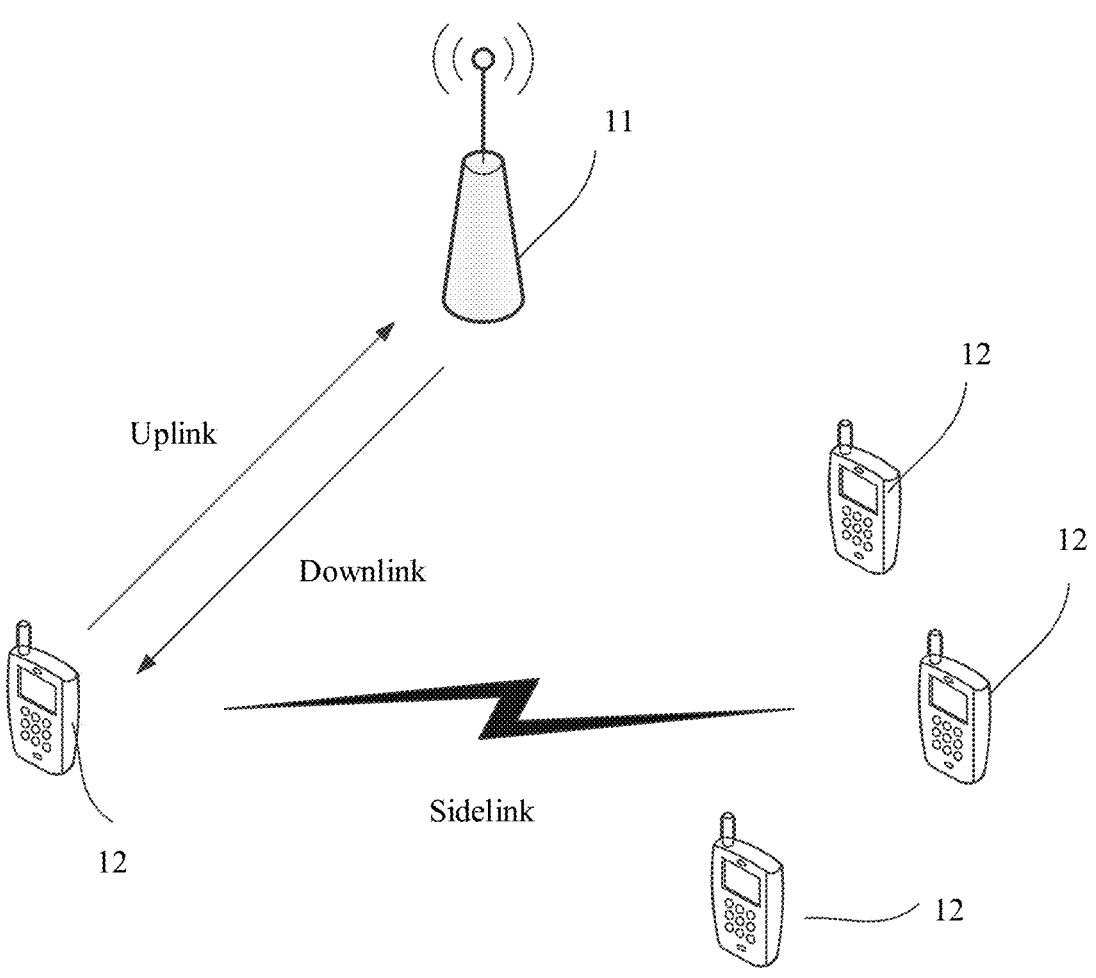

FIG. 1

Determine to activate or deactivate an SL BWP according to one of following: configuration information of a Uu BWP and configuration information of the SL BWP; or receipt of an activation or deactivation indication sent by a network side device or a peer terminal, or receipt of activation or deactivation confirmation information sent by the network side device or the peer terminal ⟋ 21

FIG. 2

Send an activation or deactivation indication to a terminal, or send activation or deactivation confirmation information to instruct the terminal to activate or deactivate an SL BWP of the terminal ⟋ 31

FIG. 3

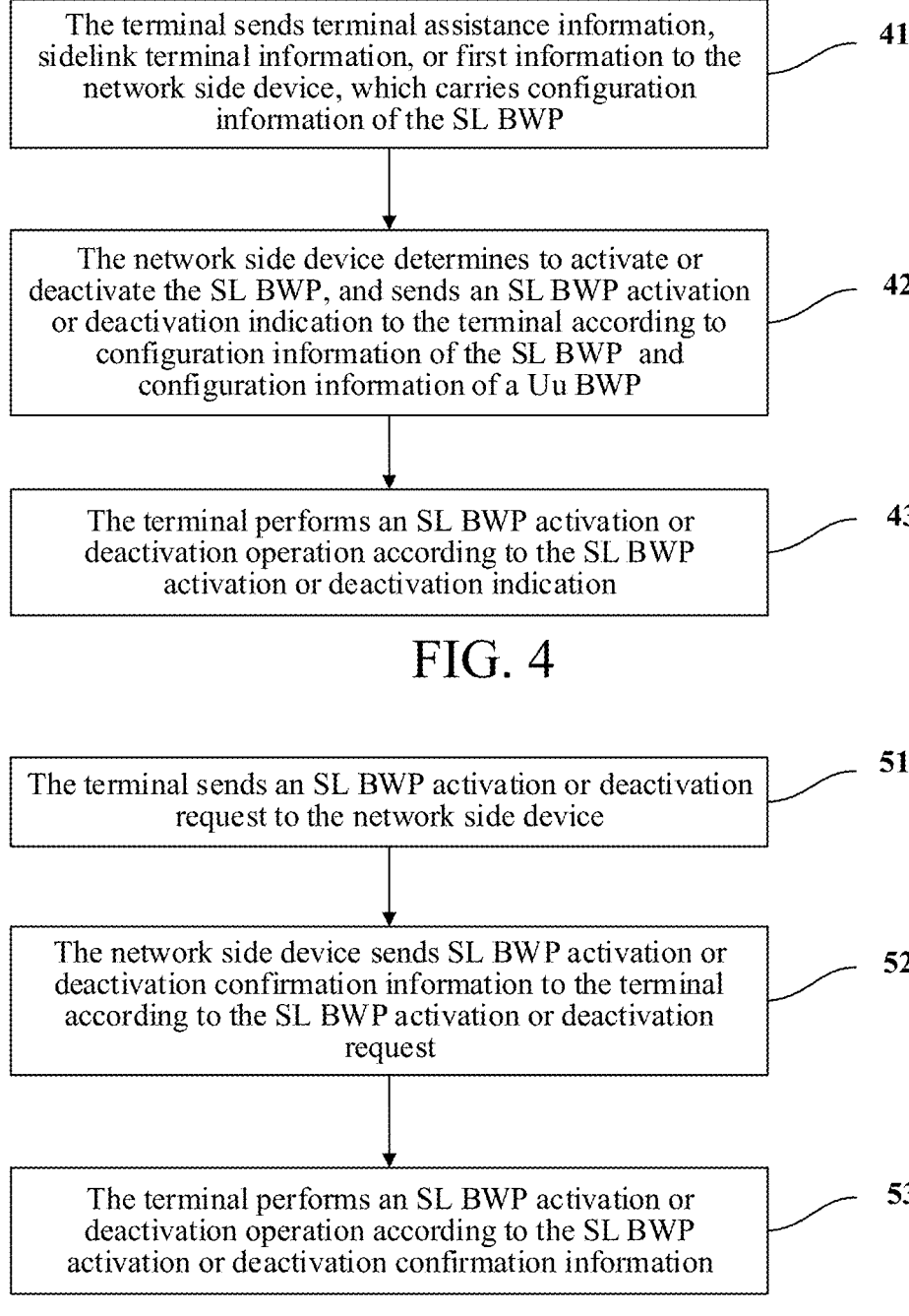

The terminal sends terminal assistance information, sidelink terminal information, or first information to the network side device, which carries configuration information of the SL BWP ⟋ 41

The network side device determines to activate or deactivate the SL BWP, and sends an SL BWP activation or deactivation indication to the terminal according to configuration information of the SL BWP and configuration information of a Uu BWP ⟋ 42

The terminal performs an SL BWP activation or deactivation operation according to the SL BWP activation or deactivation indication ⟋ 43

FIG. 4

The terminal sends an SL BWP activation or deactivation request to the network side device ⟋ 51

The network side device sends SL BWP activation or deactivation confirmation information to the terminal according to the SL BWP activation or deactivation request ⟋ 52

The terminal performs an SL BWP activation or deactivation operation according to the SL BWP activation or deactivation confirmation information ⟋ 53

In a case that a PC5-RRC connection needs to be released or the PC5-RRC connection is released, and an untransmitted MAC PDU or an MAC SDU or an MAC CE that is related to the PC5-RRC still exists, perform any one of following: discard the MAC PDU or the MAC SDU or the MAC CE; cancel an MAC CE of a trigger or cancel an SR of a trigger; cancel a process corresponding to a discarded MAC PDU; stop a timer associated with transmission of the discarded MAC PDU

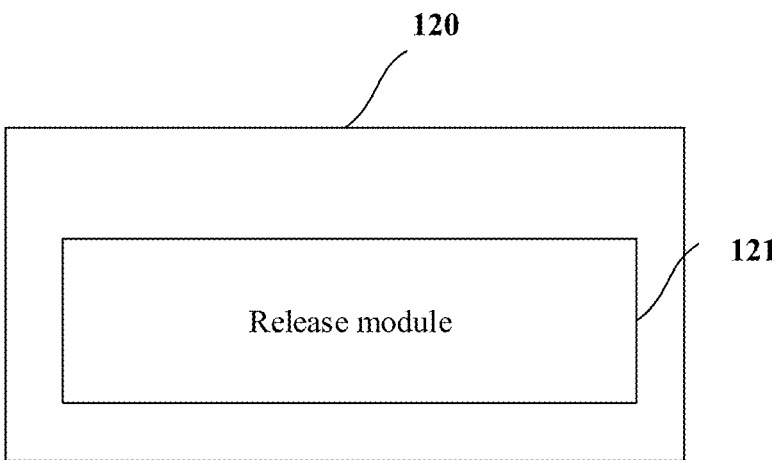

Release module

BANDWIDTH PART ACTIVATION OR DEACTIVATION METHOD, SIDELINK CONNECTION RELEASE METHOD, AND DEVICE

CROSS-REFERENCE TO RELATED APPLICATIONS

This application is a Bypass Continuation Application of PCT/CN2021/076488 filed on Feb. 10, 2021, which claims priority to Chinese Patent Application No. 202010091504.4, filed on Feb. 13, 2020, which are incorporated herein by reference in their entirety.

TECHNICAL FIELD

Embodiments of the present disclosure relate to the field of wireless communication technologies, and in particular, to a bandwidth part activation or deactivation method, a sidelink connection release method, and a device.

BACKGROUND

Sidelink Introduction

Long Term Evolution (LTE) systems start to support sidelink (SL) from the 12th release version, which is used for direct data transmission between terminal user equipment (UE, also known as a terminal) without a network device.

The design of LTE sidelink is suitable for specific public security affairs (such as emergency communication in places where a disaster such as fire or earthquake occurs), or vehicle to everything (V2X) communication. The V2X communication includes various services, such as basic security communication, advanced (autonomous) driving, formation, and sensor expansion. Because the LTE sidelink only supports broadcast communication, the LTE sidelink is mainly used for basic security communication, and other advanced V2X services are supported by using New Radio (NR) sidelink.

A 5G NR system may be used in an operating frequency band above 6 GHz that is not supported by the LTE, and supports a greater operating bandwidth. However, the current version of NR system only supports an interface between a base station and a terminal, and does not support a sidelink interface for direct communication between terminals.

Optionally, in a network architecture that supports Proximity-based Services (ProSe), a communication interface between terminals is referred to as a PC5 interface, and an interface that connects a terminal to an access network device such as an Evolved Universal Mobile Telecommunications System (UMTS) Terrestrial Radio Access Network (E-UTRAN) is referred to as a Uu interface.

Uu Bandwidth Part (BWP) Introduction

In the 5G NR system, a maximum system bandwidth of up to 400 MHz is supported in a cell, which is much greater than a maximum system bandwidth of 20 MHz of the LTE, to support a larger system and user throughput. However, for the implementation of UE, it is a huge challenge to support such a great system bandwidth, which does not help the implementation of low-cost UE. Therefore, the 5G NR system also supports dynamic and flexible bandwidth allocation. The system bandwidth is divided into a plurality of BWPs to support access of a narrow band terminal user, or a terminal user in a power saving mode.

In addition, configuration of different numerologies in different bandwidths is also supported in an NR cell. If the UE cannot support all the Numerologies in the cell, configuration of a corresponding frequency band to the UE can be avoided during configuration of the BWP for the UE.

SUMMARY

Embodiments of the present disclosure provide a bandwidth part activation or deactivation method and a sidelink connection release method and device.

According to a first aspect, an embodiment of the present disclosure provides a bandwidth part activation or deactivation method, performed by a terminal, including:

determining to activate or deactivate an SL BWP according to one of following:

configuration information of a Uu BWP and configuration information of the SL BWP; or receipt of an activation or deactivation indication sent by a network side device or a peer terminal, or receipt of activation or deactivation confirmation information sent by the network side device or the peer terminal, wherein the activation or deactivation confirmation information is feedback information of an activation or deactivation request sent by the network side device or the peer terminal for the terminal.

According to a second aspect, an embodiment of the present disclosure provides a bandwidth part activation or deactivation method, performed by a network side device, including:

sending an activation or deactivation indication to a terminal, or sending activation or deactivation confirmation information to instruct the terminal to activate or deactivate an SL BWP of the terminal.

According to a third aspect, an embodiment of the present disclosure provides a terminal, including:

a determining module, configured to determine to activate or deactivate an SL BWP according to one of following:

configuration information of a Uu BWP and configuration information the SL BWP; or receipt of an activation or deactivation indication sent by a network side device or a peer terminal, or receipt of activation or deactivation confirmation information sent by the network side device or the peer terminal, wherein the activation or deactivation confirmation information is feedback information of an activation or deactivation request sent by the network side device or the peer terminal for the terminal.

According to a fourth aspect, an embodiment of the present disclosure provides a network side device, including:

a sending module, configured to send an activation or deactivation indication to a terminal, or send activation or deactivation confirmation information to instruct the terminal to activate or deactivate an SL BWP of the terminal.

According to a fifth aspect, an embodiment of the present disclosure provides a sidelink connection release method, performed by a terminal, including: in a case that a PC5-RRC connection needs to be released or the PC5-RRC connection is released, and an untransmitted Medium Access Control (MAC) Protocol Data Unit (PDU) or an MAC Service Data Unit (SDU) or an MAC Control Element (CE) that is related to the PC5-RRC still exists, discarding the MAC PDU or the MAC SDU or the MAC CE, or canceling an MAC CE of a trigger or canceling an SR of a trigger, or canceling a process corresponding to a discarded MAC PDU, or stopping a timer associated with transmission of the discarded MAC PDU.

According to a sixth aspect, an embodiment of the present disclosure provides a terminal, including:

a release module, configured to, in a case that a PC5-RRC connection needs to be released or the PC5-RRC connection is released, and an untransmitted MAC PDU or an MAC SDU or an MAC CE that is related to the PC5-RRC still exists, discard the MAC PDU or the MAC SDU or the MAC CE, or cancel an MAC CE of a trigger or cancel an SR of a trigger, or cancel a process corresponding to a discarded MAC PDU, or stop a timer associated with transmission of the discarded MAC PDU.

According to a seventh aspect, an embodiment of the present disclosure provides a terminal, including a processor, a memory, and a computer program stored in the memory and executable on the processor, where the computer program, when executed by the processor, implements steps of the bandwidth part activation or deactivation method according to the first aspect above, or the computer program, when executed by the processor, implements steps of the sidelink connection release method according to the fifth aspect above.

According to an eighth aspect, an embodiment of the present disclosure provides a network side device, including a processor, a memory, and a computer program stored in the memory and executable on the processor, where the computer program, when executed by the processor, implements steps of the bandwidth part activation or deactivation method according to the second aspect above.

According to a ninth aspect, an embodiment of the present disclosure provides a non-transitory computer-readable storage medium, storing a computer program, where the computer program, when executed by a processor, implements steps of the bandwidth part activation or deactivation method according to the first aspect above; or the computer program, when executed by the processor, implements steps of the bandwidth part activation or deactivation method according to the second aspect above; or the computer program, when executed by the processor, implements steps of the sidelink connection release method according to the fifth aspect above.

According to a tenth aspect, an embodiment of the present disclosure provides a computer software product, stored in a non-volatile storage medium, where the computer software product is configured to be executed by at least one processor to implement steps of the bandwidth part activation or deactivation method according to the first aspect above; or the computer software product is configured to be executed by at least one processor to implement steps of the bandwidth part activation or deactivation method according to the second aspect above; or the computer software product is configured to be executed by at least one processor to implement steps of the sidelink connection release method according to the fifth aspect above.

According to an eleventh aspect, an embodiment of the present disclosure provides an electronic device, configured to perform the bandwidth part activation or deactivation method according to the first aspect above, or perform the bandwidth part activation or deactivation method according to the second aspect above, or perform the sidelink connection release method according to the fifth aspect above.

BRIEF DESCRIPTION OF THE DRAWINGS

Various other advantages and benefits will become clear to a person of ordinary skill in the art by reading the following detailed description of exemplary implementations. The accompanying drawings are merely intended to show the implementations and are do not intended to constitute a limitation on the present disclosure. Throughout the accompanying drawings, the same reference numerals are used to represent the same components. In the accompanying drawings.

FIG. 1 is a schematic architectural diagram of a wireless communication system according to an embodiment of the present disclosure;

FIG. 2 is a schematic flowchart of a bandwidth part activation or deactivation method according to an embodiment of the present disclosure;

FIG. 3 is a schematic flowchart of a bandwidth part activation or deactivation method according to another embodiment of the present disclosure;

FIG. 4 is a schematic diagram of an interaction flow between a network side device and a terminal according to an embodiment of the present disclosure;

FIG. 5 is a schematic diagram of an interaction flow between a network side device and a terminal according to another embodiment of the present disclosure;

FIG. 11 is a schematic flowchart of a sidelink connection release method according to an embodiment of the present disclosure; and FIG. 12 is a schematic structural diagram of a terminal according to yet another embodiment of the present disclosure.

DETAILED DESCRIPTION

Figure 6:
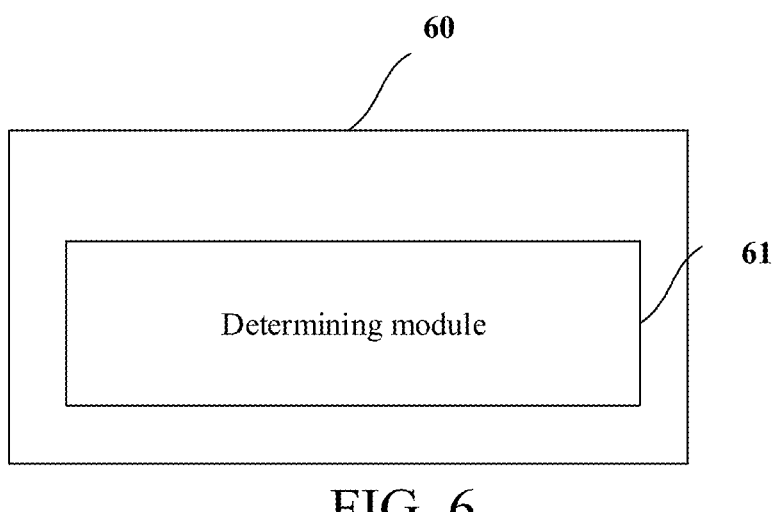
FIG. 6 is a schematic structural diagram of a terminal according to an embodiment of the present disclosure.

In the specification, claims of this disclosure, the terms "include", and any variants thereof are intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, "and/or" used in the specification and the claims means at least one of the connected objects. For example, A and/or B represents the following three cases: only A exists, only B exists, and both A and B exist.

In the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

Currently, a plurality of Uu BWPs can be configured for the UE, and the UE switches among the plurality of Uu BWPs, but only one BWP can be activated at the same moment, and other BWPs are deactivated. Currently, only one SL BWP is agreed to be configured for the UE. In addition, currently, there is no method to accurately determine a timing of activating or deactivating the SL BWP. As a result, the terminal and a network side device or a peer terminal have inconsistent understanding of activating or deactivating the SL BWP, resulting in situations such as packet loss.

The following describes the embodiments of the present disclosure with reference to the accompanying drawings. A bandwidth part activation or deactivation method, a sidelink connection release method, and a device provided in the embodiments of the present disclosure is performed by a wireless communication system. The wireless communication system may adopt a 5-th Generation (5G) system, an Evolved Long Term Evolution (eLTE) system, or a subsequent evolved communication system.

FIG. 1 is a schematic architectural diagram of a wireless communication system according to an embodiment of the present disclosure. As shown in FIG. 1, the wireless communication system may include: a network side device 11 and a plurality of terminals 12. The terminals 12 may be connected to the network side device 11 through uplink and downlink, and the terminals 12 may also be directly connected through sidelink.

The network side device 11 provided in this embodiment of the present disclosure may be a base station. The base station may be a commonly used base station, an evolved node base station (eNB), a device such as a network side device (such as a next generation node base station (gNB), a transmission and reception point (TRP)), or a cell in the 5G system, or a network side device in a subsequent evolved communication system.

The terminal 12 provided in this embodiment of the present disclosure may be a mobile phone, a tablet computer, a notebook computer, an ultra-mobile personal computer (UMPC), a netbook, a personal digital assistant (PDA), or the like.

Referring to FIG. 2, an embodiment of the present disclosure further provides a bandwidth part activation or deactivation method, performed by a terminal, including:

step 21. Determine to activate or deactivate an SL BWP according to one of following:

configuration information of a Uu BWP and configuration information of the SL BWP; or receipt of an activation or deactivation indication sent by a network side device or a peer terminal, or receipt of activation or deactivation confirmation information sent by the network side device or the peer terminal, where the activation or deactivation confirmation information is feedback information of an activation or deactivation request sent by the network side device or the peer terminal for the terminal.

In the embodiments of the present disclosure, a determining criterion for activating or deactivating an SL BWP is unified, so that a terminal and a network side device or a peer terminal have consistent understanding of activating or deactivating the SL BWP, thereby making data transmission more efficient, and reducing situations such as packet loss.

In this embodiment of the present disclosure, optionally, configuration information includes at least one of following:

a subcarrier spacing SCS or numerology;

bandwidth information;

a transmission priority of a channel; or a BWP identifier ID.

The numerology includes the subcarrier spacing, a symbol length, and the like.

In this embodiment of the present disclosure, configuration information of the Uu BWP may be sent to the terminal by the network side device by using a broadcast message or dedicated signaling.

In this embodiment of the present disclosure, configuration information of the SL BWP is configured or pre-configured by the network side device or agreed by a protocol.

The network side device configures available BWP sets (Uu BWP and/or SL BWP) in each cell for UE by using Radio Resource Control (RRC) signaling, and may dynamically switch a to-be-activated BWP by using L1 signaling. That is, when a BWP is activated, the currently activated BWP is deactivated. In addition, the network side device may configure a BWP inactivity timer for an activated BWP to control BWP switching. When the BWP inactivity timer expires, the UE switches from the currently activated BWP to a default BWP. That is, the currently activated BWP is deactivated. Currently, the network side device is not required to report channel state information (CSI) of the deactivated BWP. In addition, the terminal does not report the CSI on the deactivated BWP.

In this embodiment of the present disclosure, the activation or deactivation indication includes at least a BWP ID.

In this embodiment of the present disclosure, optionally, determining to activate the SL BWP according to at least one of following configuration information:

a numerology of a Uu BWP is the same as a numerology of the SL BWP, or an SCS of the Uu BWP is the same as an SCS of the SL BWP;

a bandwidth of the SL BWP is within a bandwidth range of the Uu BWP;

a bandwidth of the Uu BWP partially overlaps with the bandwidth of the SL BWP; or a transmission priority of a sidelink shared channel (SL-SCH) is higher than a transmission priority of a physical uplink control channel (PUCCH) and/or an a transmission priority of uplink shared channel (UL-SCH); or determining to activate the SL BWP according to one of following:

receipt of an SL BWP activation indication sent by the network side device or the peer terminal;

receipt of a Uu BWP deactivation indication sent by the network side device or the peer terminal;

receipt of SL BWP activation confirmation information sent by the network side device or the peer terminal; or receipt of Uu BWP deactivation confirmation information sent by the network side device or the peer terminal.

In some embodiments of the present disclosure, only one of the Uu BWP and the SL BWP can be activated. In this case, the SL BWP activation indication may be equivalent to the Uu BWP deactivation indication, or the Uu BWP deactivation indication may be equivalent to the SL BWP activation indication.

A transmission priority of a sidelink shared channel being higher than a transmission priority of a physical uplink control channel and/or a transmission priority of an uplink shared channel includes at least one of following:

a transmission priority of data being transmitted or to be transmitted on the SL-SCH is higher than a transmission priority of data being transmitted or to be transmitted on the UL-SCH;

a transmission priority of an SL Buffer Status Report (BSR) is higher than a transmission priority of a UL BSR; or a transmission priority of data being transmitted or to be transmitted on the SL-SCH is higher than a transmission priority of to-be-transmitted data corresponding to a Scheduling Request (SR) on the PUCCH.

In this embodiment of the present disclosure, optionally, determining to deactivate the SL BWP according to at least one of following configuration information:

a numerology of a Uu BWP is different from numerology of the SL BWP, or an SCS of the Uu BWP is different from an SCS of the SL BWP;

a bandwidth of the Uu BWP is within a bandwidth range of the SL BWP;

a bandwidth of the Uu BWP partially overlaps with the bandwidth of the SL BWP; or a transmission priority of a sidelink shared channel is lower than a transmission priority of a physical uplink control channel and/or an uplink shared channel; or determining to deactivate the SL BWP according to one of following:

receipt of an SL BWP deactivation indication sent by the network side device or the peer terminal;

receipt of a Uu BWP activation indication sent by the network side device or the peer terminal;

receipt of SL BWP deactivation confirmation information sent by the network side device or the peer terminal; or receipt of Uu BWP activation confirmation information sent by the network side device or the peer terminal.

In some embodiments of the present disclosure, only one of the Uu BWP and the SL BWP can be activated. In this case, the SL BWP deactivation indication may be equivalent to the Uu BWP activation indication, or the Uu BWP activation indication may be equivalent to the SL BWP deactivation indication.

A transmission priority of a sidelink shared channel being lower than a transmission priority of a physical uplink control channel and/or an uplink shared channel includes at least one of following:

a transmission priority of data being transmitted or to be transmitted on the SL-SCH is lower than a transmission priority of data being transmitted or to be transmitted on the UL-SCH;

a transmission priority of an SL Buffer Status Report (BSR) is lower than a transmission priority of a UL BSR; or a transmission priority of data being transmitted or to be transmitted on the SL-SCH is lower than a transmission priority of to-be-transmitted data corresponding to a Scheduling Request (SR) on the PUCCH.

In this embodiment of the present disclosure, the activation or deactivation indication may carry one or more BWP IDs to indicate the BWP corresponding to the activation or deactivation indication.

In this embodiment of the present disclosure, optionally, a type of the Uu BWP is at least one of following:

an initial downlink BWP;

an initial uplink BWP;

a first activation downlink BWP;

a first activation uplink BWP;

a current activation downlink BWP;

a current activation uplink BWP;

an uplink channel bandwidth of the terminal;

a downlink channel bandwidth of the terminal; or a bandwidth occupied by a control resource set (CORSET) #0.

The first activation downlink BWP refers to the first activation downlink BWP after the initial downlink BWP, and the first activation uplink BWP refers to the first activated uplink BWP after the initial uplink BWP.

In this embodiment of the present disclosure, a type of the Uu BWP may be sent to the terminal by the network side device by using a broadcast message or dedicated signaling.

In this embodiment of the present disclosure, optionally, before the receipt of the activation or deactivation indication, the method further includes: sending configuration information of the SL BWP to the network side device or the peer terminal; or Before the receipt of the activation or deactivation confirmation information sent by the network side device or the peer terminal, the method further includes: sending an SL BWP activation or deactivation request.

In this embodiment of the present disclosure, optionally, configuration information of the SL BWP or the activation or deactivation request is carried by terminal assistance information, sidelink terminal information, or first information. The first information may be separately defined information except terminal assistance information or sidelink terminal information.

If configuration information of the SL BWP is sent to the network side device or the peer terminal, the network side device or the peer terminal may determine to activate or deactivate the SL BWP. Then, the network side device or the peer terminal transmits the activation or deactivation indication to the terminal.

If the SL BWP activation or deactivation request is sent to the network side device or the peer terminal, the network side device or the peer terminal may feed back the SL BWP activation or deactivation confirmation information to the terminal.

In this embodiment of the present disclosure, for activating an SL BWP, there is not necessarily an explicit activation process. The SL BWP may be activated with the SL BWP being configured. Provided that conditions for deactivation are not met, the SL BWP is considered to be activated. For deactivation, there may be or may not be an explicit deactivation process. When deactivation occurs, corresponding sending and/or receiving may be immediately stopped, or deactivation may be performed after the current sending and/or receiving is completed.

In addition, if only one of the Uu BWP and the SL BWP can be activated, when activation conditions of the SL BWP are met, it may mean that the Uu BWP needs to be deactivated. When activation conditions of the Uu BWP are met, it may mean that the SL BWP needs to be deactivated. In some embodiments, all conditions for determining to activate the SL BWP may be equivalent to conditions for determining to deactivate the Uu BWP. All conditions for determining to deactivate the SL BWP may also be equivalent to conditions for determining to activate the Uu BWP.

In this embodiment of the present disclosure, optionally, after the determining to deactivate an SL BWP, the method further includes at least one of following:

stopping sending on a Physical Sidelink Broadcast Channel (PSBCH);

stopping sending on a Physical Sidelink Control Channel (PSCCH);

stopping sending on a sidelink shared channel (SL-SCH);

stopping sending on a Physical Sidelink Feedback Channel (PSFCH);

stopping sending on a physical sidelink broadcast channel;

stopping monitoring or receiving on the physical sidelink control channel;

stopping receiving on the sidelink shared channel;

stopping monitoring or receiving on the physical sidelink feedback channel;

stopping reporting channel state information;

clearing or suspending one or more sidelink configured grant type 1 ( ) resources on the SL BWP;

clearing or suspending one or more sidelink configured grant type 2 ( ) resources on the SL BWP;

releasing one or more PC5-RRC connections on the SL BWP; or for the PC5-RRC connection that needs to be released or the PC5-RRC connection that is released, in a case that an untransmitted MAC PDU or an MAC SDU or an MAC CE still exists for a to-be-released PC5-RRC connection or a released PC5-RRC connection, discarding the MAC PDU or the MAC SDU or the MAC CE, or canceling an MAC CE of a trigger or canceling a scheduling request of a trigger.

The following is a brief introduction to the Physical Sidelink Control Channel (PSCCH): the UE sends Sidelink Control Information (SCI) through the PSCCH, and schedules transmission of the Physical Sidelink Shared Channel (PSSCH) to send data. The transmission is performed in a broadcast form, and a receiver does not feed back whether receiving succeeds to a transmitter. Optionally, a destination ID or a connection ID corresponding to the MAC PDU belongs to the PC5-RRC. For example, the destination ID is an ID of the peer terminal of the released PC5-RRC connection, and the connection ID is a connection ID of the released PC5-RRC connection.

After activating or deactivating the SL BWP, the terminal may further interact with the network side device or the peer terminal, so as to reach an agreement with the network side device or the peer terminal on activating or deactivating the SL BWP.

The following describes some interaction behaviors between the terminal and the network side device or the peer terminal when the SL BWP is activated or deactivated.

In this embodiment of the present disclosure, optionally, after the determining to activate or deactivate the SL BWP, the method further includes: sending the activation or deactivation indication on sidelink or uplink, where the activation or deactivation indication includes at least a BWP ID. The activation or deactivation indication is used for notifying the peer terminal or the network side device of activation or deactivation of the SL BWP. The activation or deactivation indication may be used for indicating activation or deactivation of one or more SL BWPs.

In this embodiment of the present disclosure, optionally, in a case that the activation or deactivation indication is sent on the sidelink, the activation or deactivation indication is carried in at least one of following messages:

a broadcast or multicast message;

a PC5-RRC message;

a medium access control control element (MAC CE) message;

a PC5-S message;

a message on an SL-SCH; or a message on a PSCCH.

Optionally, the message on the PSCCH includes at least one of following: first-step SCI or second-step SCI.

In this embodiment of the present disclosure, optionally, after the sending an activation indication on sidelink or uplink, the method further includes:

starting sidelink transmission; or after receiving the activation confirmation information sent by the peer terminal, starting the sidelink transmission.

In this embodiment of the present disclosure, optionally, after the sending a deactivation indication on sidelink or uplink, the method further includes:

stopping sidelink transmission; or after receiving the deactivation confirmation information sent by the peer terminal, stopping the sidelink transmission.

FIG. 3 is a schematic flowchart of a bandwidth part activation or deactivation method according to another embodiment of the present disclosure. The bandwidth part activation or deactivation method is performed by a network side device, including:

step 31. Send an activation or deactivation indication to a terminal, or send activation or deactivation confirmation information to instruct the terminal to activate or deactivate an SL BWP of the terminal.

In the embodiments of the present disclosure, a determining criterion for activating or deactivating an SL BWP is unified, so that a terminal and a network side device or a peer terminal have consistent understanding of activating or deactivating the SL BWP, thereby making data transmission more efficient, and reducing situations such as packet loss.

Optionally, before the sending an activation or deactivation indication to a terminal, the method further includes:

determining to activate or deactivate the SL BWP of the terminal according to configuration information of a Uu BWP and configuration information of the SL BWP of the terminal;

or before the sending activation or deactivation confirmation information, the method further includes:

determining to activate or deactivate the SL BWP of the terminal according to receipt of an activation or deactivation request sent by the terminal.

In this embodiment of the present disclosure, the activation or deactivation indication includes at least a BWP ID.

In this embodiment of the present disclosure, optionally, configuration information includes at least one of following:

an SCS or numerology;

bandwidth information;

a transmission priority of a channel; or a BWP ID.

In this embodiment of the present disclosure, optionally, determining to activate the SL BWP of the terminal according to at least one of following configuration information:

a numerology of a Uu BWP of the terminal is the same as a numerology of the SL BWP, or an SCS of the Uu BWP of the terminal is the same as an SCS of the SL BWP;

a bandwidth of the SL BWP of the terminal is within a bandwidth range of the Uu BWP;

a bandwidth of the Uu BWP of the terminal partially overlaps with the bandwidth of the SL BWP; or a transmission priority of a sidelink shared channel of the terminal is higher than a transmission priority of a physical uplink control channel and/or a transmission priority of an uplink shared channel;

or determining to activate the SL BWP of the terminal according to one of following:

receiving SL BWP activation request information sent by the terminal; or receiving Uu BWP deactivation request information sent by the terminal.

In this embodiment of the present disclosure, optionally, determining to deactivate the SL BWP of the terminal according to at least one of following configuration information:

a numerology of a Uu BWP of the terminal is different from a numerology of the SL BWP, or an SCS of the Uu BWP of the terminal is different from an SCS of the SL BWP;

a bandwidth of the Uu BWP of the terminal is within a bandwidth range of the SL BWP of the terminal;

a bandwidth of the Uu BWP of the terminal partially overlaps with the bandwidth of the SL BWP; or a transmission priority of a sidelink shared channel of the terminal is lower than a transmission priority of a physical uplink control channel and/or a transmission priority of an uplink shared channel;

or determining to deactivate the SL BWP of the terminal according to one of following:

receiving SL BWP deactivation request information sent by the terminal; or receiving Uu BWP activation request information sent by the terminal.

In this embodiment of the present disclosure, optionally, a type of the Uu BWP is at least one of following:

an initial downlink BWP of the terminal;

an initial uplink BWP of the terminal;

a first activation downlink BWP of the terminal;

a first activation uplink BWP of the terminal;

a current activation downlink BWP of the terminal;

a current activation uplink BWP of the terminal;

an uplink channel bandwidth of the terminal;

a downlink channel bandwidth of the terminal; or a BWP of a bandwidth occupied by a Control Resource Set (CORSET) #0.

In this embodiment of the present disclosure, optionally, before the determining to activate or deactivate an SL BWP of the terminal, the method further includes: receiving configuration information of the the SL BWP, or receiving the activation or deactivation request.

In this embodiment of the present disclosure, optionally, configuration information of the SL BWP or the activation or deactivation request is carried by terminal assistance information, sidelink terminal information, or first information. The first information may be separately defined information except terminal assistance information or sidelink terminal information.

Referring to FIG. 4, the following describes an interaction flow between the network side device and the terminal:

step 41. The terminal sends terminal assistance information, sidelink terminal information, or first information to the network side device, which carries configuration information of the SL BWP, and configuration information of the SL BWP includes: an SL BWP numerology and/or a BWP ID.

step 42: The network side device determines to activate or deactivate the SL BWP, and sends an SL BWP activation or deactivation indication to the terminal according to configuration information of the SL BWP and configuration information of the Uu BWP.

step 43: The terminal performs an SL BWP activation or deactivation operation according to the SL BWP activation or deactivation indication.

It should be noted that step 41 is not a necessary prerequisite for step 42. For example, if the terminal initially reports configuration information of the SL BWP to the network side device, the network side device sends the SL BWP activation or deactivation indication according to configuration information of the SL BWP reported by the terminal. Subsequently, the network side device may send the SL BWP activation or deactivation indication again at another moment according to the implementation of the network side device. In another example, the network side device decides whether to send the SL BWP activation or deactivation indication based on the implementation of the network side device.

In addition, the network side device may further send the SL BWP activation or deactivation indication to RX (receiver) UE according to configuration information of the SL BWP sent by TX (transmitter) UE, or send the SL BWP activation or deactivation indication to the TX UE according to configuration information of the SL BWP sent by the RX UE.

Alternatively, referring to FIG. 5, in this embodiment of the present disclosure, an interaction flow between the network side device and the terminal may be as follows:

step 51. The terminal sends an SL BWP activation or deactivation request to the network side device;

step 52. The network side device sends SL BWP activation or deactivation confirmation information to the terminal according to the SL BWP activation or deactivation request.

step 53. The terminal performs an SL BWP activation or deactivation operation according to the SL BWP activation or deactivation confirmation information.

Referring to FIG. 6, an embodiment of the present disclosure further provides a terminal 60, including:

a determining module 61, configured to determine to activate or deactivate an SL BWP according to one of following:

configuration information of a Uu BWP and configuration information of the SL BWP; or receipt of an activation or deactivation indication sent by a network side device or a peer terminal, or receipt of activation or deactivation confirmation information sent by the network side device or the peer terminal, where the activation or deactivation confirmation information is feedback information of an activation or deactivation request sent by the network side device or the peer terminal for the terminal.

In this embodiment of the present disclosure, the activation or deactivation indication includes at least a BWP ID.

Optionally, configuration information includes at least one of following:

a subcarrier spacing SCS or numerology;

bandwidth information;

a transmission priority of a channel; or a BWP ID.

Optionally, the determining module 61 is configured to determine to activate the SL BWP according to at least one of following configuration information:

a numerology of a Uu BWP is the same as a numerology of the SL BWP, or an SCS of the Uu BWP is the same as an SCS of the SL BWP;

a bandwidth of the SL BWP is within a bandwidth range of the Uu BWP;

a bandwidth of the Uu BWP partially overlaps with the bandwidth of the SL BWP; or a transmission priority of a sidelink shared channel is higher than a transmission priority of a physical uplink control channel and/or a transmission priority of an uplink shared channel;

or determining to activate the SL BWP according to one of following:

receipt of an SL BWP activation indication sent by the network side device or the peer terminal;

receipt of a Uu BWP deactivation indication sent by the network side device or the peer terminal;

receipt of SL BWP activation confirmation information sent by the network side device or the peer terminal; or receipt of Uu BWP deactivation confirmation information sent by the network side device or the peer terminal.

Optionally, the determining module 61 is configured to determine to deactivate the SL BWP according to at least one of following configuration information:

a numerology of a Uu BWP is different from numerology of the SL BWP, or an SCS of the Uu BWP is different from an SCS of the SL BWP;

a bandwidth of the Uu BWP is within a bandwidth range of the SL BWP;

a bandwidth of the Uu BWP partially overlaps with the bandwidth of the SL BWP; or a transmission priority of a sidelink shared channel is lower than a transmission priority of a physical uplink control channel and/or a transmission priority of an uplink shared channel;

or determining to deactivate the SL BWP according to one of following:

receipt of an SL BWP deactivation indication sent by the network side device or the peer terminal;

receipt of a Uu BWP activation indication sent by the network side device or the peer terminal;

receipt of SL BWP deactivation confirmation information sent by the network side device or the peer terminal; or receipt of Uu BWP activation confirmation information sent by the network side device or the peer terminal.

Optionally, a type of the Uu BWP is at least one of following:

an initial downlink BWP;

an initial uplink BWP;

a first activation downlink BWP;

a first activation uplink BWP;

a current activation downlink BWP;

a current activation uplink BWP;

an uplink channel bandwidth of the terminal;

a downlink channel bandwidth of the terminal; or a bandwidth occupied by a Control Resource Set #0.

Optionally, the terminal further includes:

a first sending module, configured to send configuration information of the SL BWP to the network side device or the peer terminal, or send the activation or deactivation request.

Optionally, configuration information of the SL BWP or the activation or deactivation request is carried by terminal assistance information, sidelink terminal information, or first information.

Optionally, the terminal further includes:

a first execution module, configured to execute at least one of following after the determining module determines to deactivate the SL BWP:

stopping sending on a physical sidelink broadcast channel;

stopping sending on a physical sidelink control channel;

stopping sending on a sidelink shared channel;

stopping sending on a physical sidelink feedback channel;

stopping monitoring or receiving on the physical sidelink broadcast channel;

stopping monitoring or receiving on the physical sidelink control channel;

stopping receiving on the sidelink shared channel;

stopping monitoring or receiving on the physical sidelink feedback channel;

stopping reporting channel state information;

clearing or suspending one or more sidelink configured grant type 1 resources on the SL BWP; or clearing or suspending one or more sidelink configured grant type 2 resources on the SL BWP.

Optionally, the terminal 60 further includes:

a second sending module, configured to send an activation or deactivation indication on sidelink or uplink, where the activation or deactivation indication includes at least a BWP ID.

Optionally, in a case that the activation or deactivation indication is sent on the sidelink, the activation or deactivation indication is carried in at least one of following messages:

a broadcast or multicast message;

a PC5-RRC message;

an MAC CE message;

a PC5-S message;

a message on an SL-SCH; or a message on a PSCCH.

Optionally, the message on the PSCCH includes at least one of following: first-step SCI or second-step SCI.

Optionally, the terminal 60 further includes:

a second execution module, configured to start sidelink transmission; or after receiving the activation confirmation information sent by the peer terminal, start the sidelink transmission.

Optionally, the terminal 60 further includes:

a third execution module, configured to stop sidelink transmission; stop sidelink transmission or after receiving the deactivation confirmation information sent by the peer terminal.

The terminal provided in this embodiment of the present disclosure can implement the processes implemented by the terminal in the method embodiment in FIG. 2. To avoid repetition, details are not described herein again.

Figure 7:
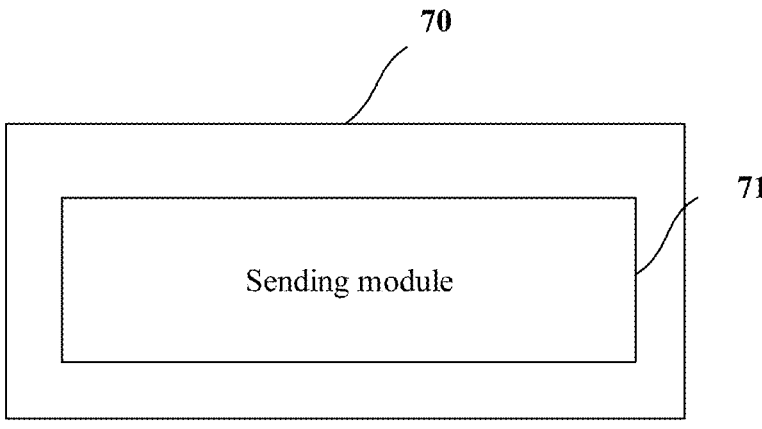
FIG. 7 is a schematic structural diagram of a network side device according to an embodiment of the present disclosure.

Referring to FIG. 7, an embodiment of the present disclosure further provides a network side device 70, including:

a sending module 71, configured to send an activation or deactivation indication to a terminal, or send activation or deactivation confirmation information to instruct the terminal to activate or deactivate an SL BWP of the terminal.

Optionally, the network side device further includes:

a first determining module, configured to determine to activate or deactivate the SL BWP of the terminal according to configuration information of a Uu BWP and configuration information of the SL BWP of the terminal;

or a second determining module, configured to determine to activate or deactivate the SL BWP of the terminal according to receipt of an activation or deactivation request sent by the terminal.

In this embodiment of the present disclosure, the activation or deactivation indication includes at least a BWP ID.

Optionally, configuration information includes at least one of following:

an SCS or numerology;

bandwidth information;

a transmission priority of a channel; or a BWP ID.

Optionally, the first determining module is configured to determine to activate the SL BWP of the terminal according to at least one of following configuration information:

a numerology of a Uu BWP of the terminal is the same as a numerology of the SL BWP, or an SCS of the Uu BWP of the terminal is the same as an SCS of the SL BWP;

a bandwidth of the SL BWP of the terminal is within a bandwidth range of the Uu BWP;

a bandwidth of the Uu BWP of the terminal partially overlaps with the bandwidth of the SL BWP; or a transmission priority of a sidelink shared channel of the terminal is higher than a transmission priority of a physical uplink control channel and/or a transmission priority of an uplink shared channel;

or the second determining module is configured to determine to activate the SL BWP of the terminal according to one of following:

receiving SL BWP activation request information sent by the terminal; or receiving Uu BWP deactivation request information sent by the terminal.

Optionally, the first determining module is configured to determine to deactivate the SL BWP of the terminal according to at least one of following configuration information:

a numerology of a Uu BWP of the terminal is different from a numerology of the SL BWP, or an SCS of the Uu BWP of the terminal is different from an SCS of the SL BWP;

a bandwidth of the Uu BWP of the terminal is within a bandwidth range of the SL BWP of the terminal;

a bandwidth of the Uu BWP of the terminal partially overlaps with the bandwidth of the SL BWP; or a transmission priority of a sidelink shared channel of the terminal is lower than a transmission priority of a physical uplink control channel and/or a transmission priority of an uplink shared channel;

or the second determining module is configured to determine to deactivate the SL BWP of the terminal according to one of following:

receiving SL BWP deactivation request information sent by the terminal; or receiving Uu BWP activation request information sent by the terminal.

Optionally, a type of the Uu BWP is at least one of following:

an initial downlink BWP of the terminal;

an initial uplink BWP of the terminal;

a first activation downlink BWP of the terminal;

a first activation uplink BWP of the terminal;

a current activation downlink BWP of the terminal;

a current activation uplink BWP of the terminal;

an uplink channel bandwidth of the terminal;

a downlink channel bandwidth of the terminal; or a BWP of a bandwidth occupied by a Control Resource Set #0.

Optionally, the network side device further includes:

a receiving module, configured to receive configuration information of the SL BWP, or receive the activation or deactivation request.

Optionally, configuration information of the SL BWP or the activation or deactivation request is carried by terminal assistance information, sidelink terminal information, or first information.

The terminal provided in this embodiment of the present disclosure can implement the processes implemented by the terminal in the method embodiment in FIG. 3. To avoid repetition, details are not described herein again.

In the related art, when a PC5-RRC connection needs to be released or is released, a method for processing the untransmitted MAC PDU or the MAC SDU or the MAC CE that is related to the PC5-RRC is not specified, resulting in a situation in which the terminal fails to send data.

To resolve the foregoing problem, referring to FIG. 11, an embodiment of the present disclosure further provides a sidelink connection release method, performed by a terminal, including:

step 111. In a case that a PC5-RRC connection needs to be released or the PC5-RRC connection is released, and an untransmitted MAC PDU or an MAC SDU or an MAC CE that is related to the PC5-RRC still exists, perform any one of following:

discard the MAC PDU or the MAC SDU or the MAC CE;

cancel an MAC CE of a trigger or cancel an SR of a trigger;

cancel a process corresponding to a discarded MAC PDU;

stop a timer associated with transmission of the discarded MAC PDU.

In this embodiment of the present disclosure, during releasing the PC5-RRC connection, an agreement is reached on a method for processing the untransmitted MAC PDU that is related to the PC5-RRC.

In this embodiment of the present disclosure, a method for processing the untransmitted MAC PDU or the MAC SDU or the MAC CE that is related to the PC5-RRC connection that needs to be released or is released is specified, for example, discarding or other processing is performed, so as to prevent the terminal from failing to send data.

In this embodiment of the present disclosure, the untransmitted MAC PDU or the MAC SDU or the MAC CE includes both the MAC PDU or the MAC SDU or the MAC CE that is transmitted on the sidelink and the MAC PDU or the MAC SDU or the MAC CE that is transmitted on the uplink, for example, a related BSR is reported and CSI is reported for the released PC5-RRC connection.

Optionally, a destination ID or a connection ID corresponding to the MAC PDU belongs to the PC5-RRC. For example, the destination ID is an ID of the peer terminal of the released PC5-RRC connection, and the connection ID is a connection ID of the released PC5-RRC connection.

Optionally, the releasing the PC5-RRC connection is performed when the SL BWP is deactivated. Certainly, in some other embodiments of the present disclosure, the releasing the PC5-RRC connection may also be out of other reasons, for example, a radio link failure (RLF).

Referring to FIG. 12, an embodiment of the present disclosure further provides a terminal 120, including:

a release module 121, configured to, in a case that a PC5-RRC connection needs to be released or the PC5-RRC connection is released, and an untransmitted MAC PDU or an MAC SDU or an MAC CE that is related to the PC5-RRC still exists, discard the MAC PDU or the MAC SDU or the MAC CE, or cancel an MAC CE of a trigger or canceling an SR of a trigger, or cancel a process corresponding to a discarded MAC PDU, or stop a timer associated with transmission of the discarded MAC PDU.

In this embodiment of the present disclosure, during releasing the PC5-RRC connection, an agreement is reached on a method for processing the untransmitted MAC PDU that is related to the PC5-RRC.

Optionally, a destination ID or a connection ID corresponding to the MAC PDU belongs to the PC5-RRC. For example, the destination ID is an ID of the peer terminal of the released PC5-RRC connection, and the connection ID is a connection ID of the released PC5-RRC connection.

Optionally, the releasing the PC5-RRC connection is performed when the SL BWP is deactivated. Certainly, in some other embodiments of the present disclosure, the releasing the PC5-RRC connection may also be out of other reasons, for example, a radio link failure (RLF).

Figure 8:
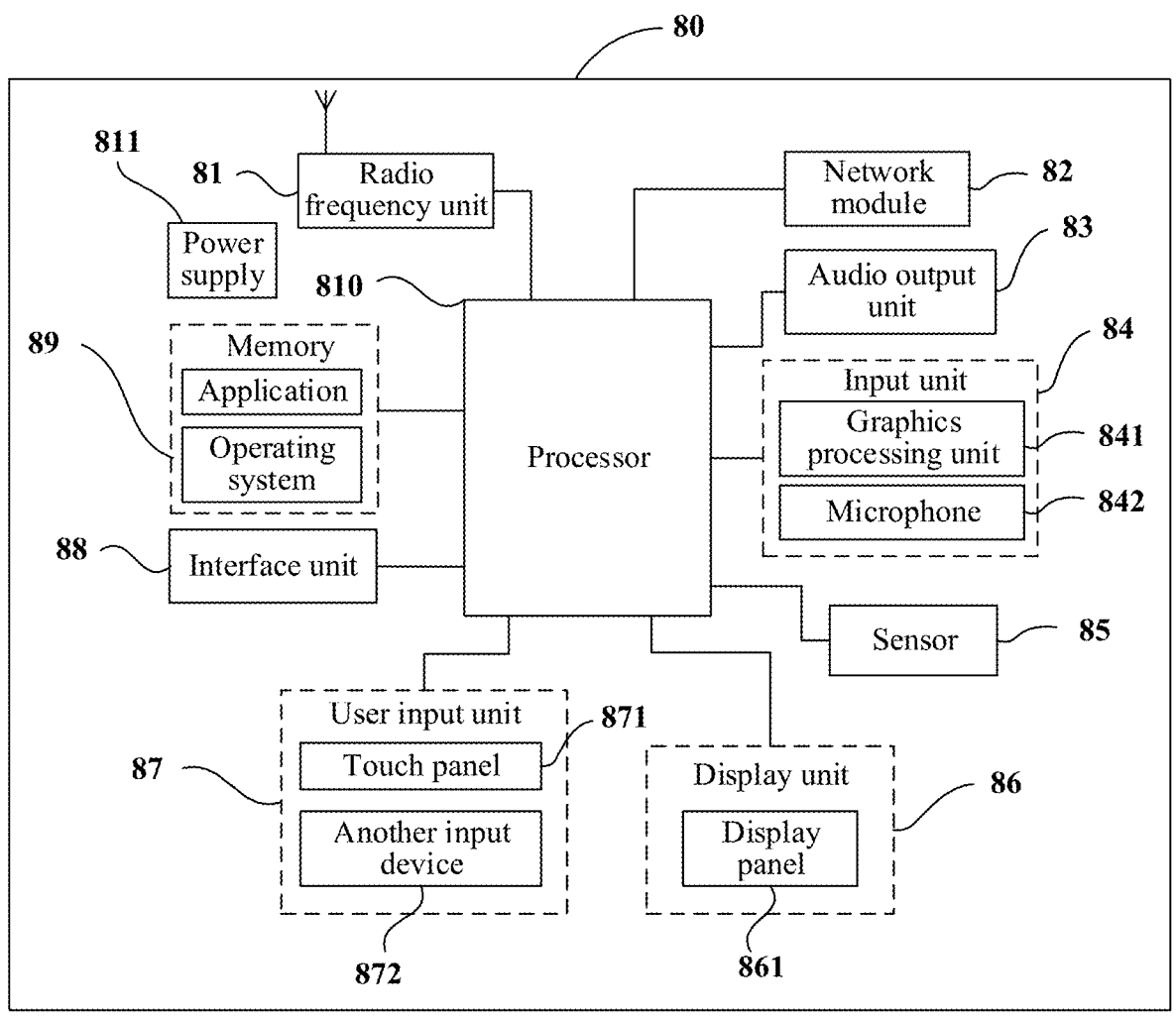
FIG. 8 is a schematic structural diagram of a terminal according to another embodiment of the present disclosure.

FIG. 8 is a schematic diagram of a hardware structure of a terminal for implementing various embodiments of the present disclosure. The terminal 80 includes but is not limited to: components such as a radio frequency unit 81, a network module 82, an audio output unit 83, an input unit 84, a sensor 85, a display unit 86, a user input unit 87, an interface unit 88, a memory 89, a processor 810, and a power supply 811. A person skilled in the art may understand that the structure of the terminal shown in FIG. 8 does not constitute a limitation to the terminal, and the terminal may include more or fewer components than those shown in the figure, or some components may be combined, or a different component deployment may be used In this embodiment of the present disclosure, the terminal includes, but is not limited to, a mobile phone, a tablet computer, a notebook computer, a palmtop computer, an in-vehicle terminal, a wearable device, a pedometer, and the like.

The processor 810 is configured to determine to activate or deactivate a sidelink bandwidth part SL BWP according to one of following:

configuration information of a Uu BWP and configuration information of the SL BWP; or
   receipt of an activation or deactivation indication sent by a network side device or a peer terminal, or receipt of activation or deactivation confirmation information sent by the network side device or the peer terminal, where the activation or deactivation confirmation information is feedback information of an activation or deactivation request sent by the network side device or the peer terminal for the terminal.

In the embodiments of the present disclosure, a determining criterion for activating or deactivating an SL BWP is unified, so that a terminal and a network side device or a peer terminal have consistent understanding of activating or deactivating the SL BWP, thereby making data transmission more efficient, and reducing situations such as packet loss.

The terminal provided in this embodiment of the present disclosure can implement the processes implemented by the terminal in the method embodiment in FIG. 2. To avoid repetition, details are not described herein again.

Alternatively, the processor 810 is configured to discard, in a case that a PC5-RRC connection needs to be released or the PC5-RRC connection is released, and an untransmitted MAC PDU or an MAC SDU or an MAC CE that is related to the PC5-RRC still exists, the MAC PDU or the MAC SDU or the MAC CE, or canceling an MAC CE of a trigger or canceling an SR of a trigger, or canceling a process corresponding to a discarded MAC PDU, or stopping a timer associated with transmission of the discarded MAC PDU.

In this embodiment of the present disclosure, during releasing the PC5-RRC connection, an agreement is reached on a method for processing the untransmitted MAC PDU that is related to the PC5-RRC. The terminal provided in this embodiment of the present disclosure can implement the processes implemented by the terminal in the method embodiment in FIG. 11. To avoid repetition, details are not described herein again.

It should be understood that, in this embodiment of the present disclosure, the radio frequency unit 81 may be configured to receive and transmit a signal during an information receiving and sending process or a call process. Optionally, the radio frequency unit receives downlink data from a base station, then delivers the downlink information to the processor 810 for processing; and in addition, sends related uplink data to the base station. Generally, the radio frequency unit 81 includes, but is not limited to, an antenna, at least one amplifier, a transceiver, a coupler, a low noise amplifier, a duplexer, and the like. In addition, the radio frequency unit 81 may further communicate with the network and another device through wireless communication systems.

The terminal may provide, by using the network module 82, wireless broadband Internet access for a user, for example, help the user to receive or transmit Email, browse a webpage, and access stream media.

An audio output unit 83 may convert audio data received by the radio frequency unit 81 or the network module 82 or stored in a memory 89 into an audio signal and output as sound. In addition, the audio output unit 83 may further provide an audio output that is related to a particular function executed by the terminal 80 (for example, a call signal receiving sound or a message receiving sound). The audio output unit 83 includes a speaker, a buzzer, a receiver, and the like.

An input unit 84 is configured to receive an audio signal or a video signal. The input unit 84 may include a graphics processing unit (GPU) 841 and a microphone 842. The GPU 841 processes image data of a static picture or a video acquired by an image capturing device (for example, a camera) in a video capturing mode or an image capturing mode. An image frame that has been processed may be displayed on a display unit 86. The image frame processed by the GPU 841 may be stored in the memory 89 (or another storage medium) or sent through the radio frequency unit 81 or the network module 82. The microphone 842 can receive sound and can process such sound into audio data. The processed audio data may be transferred, in a phone talk mode, to a format that may be sent to a mobile communication base station via the radio frequency unit 81 to output.

The terminal 80 further includes at least one sensor 85, such as an optical sensor, a motion sensor, and other sensors. Optionally, the optical sensor includes an ambient light sensor and a proximity sensor. The ambient light sensor may adjust luminance of the display panel 861 according to brightness of the ambient light. The proximity sensor may switch off the display panel 861 and/or backlight when the terminal 80 is moved to the ear. As one type of motion sensor, an acceleration sensor may detect magnitude of accelerations in various directions (which generally are triaxial), may detect magnitude and a direction of the gravity when static, and may be configured to identify a terminal attitude (such as switchover between horizontal and vertical screens, a related game, and attitude calibration of a magnetometer), a related function of vibration identification (such as a pedometer and a knock); and the sensor 85 may further include a fingerprint sensor, a pressure sensor, an iris sensor, a molecular sensor, a gyroscope, a barometer, a hygrometer, a thermometer, an infrared sensor, etc., which are not be repeated herein.

A display unit 86 is configured to display information input by the user or information provided for the user. The display unit 86 may include a display panel 861. The display panel 861 may be configured by using a liquid crystal display (LCD), an organic light-emitting diode (OLED), or the like.

A user input unit 87 may be configured to: receive input digit or character information, and generate a keyboard signal input related to a user setting and function control of the terminal. Optionally, the user input unit 87 includes a touch panel 871 and another input device 872. The touch panel 871, also referred to as a touchscreen, may collect a touch operation of a user on or near the touch panel (such as an operation of a user on or near the touch panel 871 by using any suitable object or attachment, such as a finger or a stylus). The touch panel 871 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 810. Moreover, the touch controller may receive and execute a command transmitted from the processor 810. In addition, the touch panel 871 may be implemented by using various types, such as a resistive type, a capacitive type, an infrared type, and a surface acoustic wave type. In addition to the touch panel 871, the user input unit 87 may further include the another input device 872. Optionally, the another input device 872 may include, but is not limited to, a physical keyboard, a functional key (such as a volume control key or a switch key), a track ball, a mouse, and a joystick, which are not described herein again.

Optionally, the touch panel 871 may cover the display panel 861. After detecting a touch operation on or near the touch panel 871, the touch panel transfers the touch operation to the processor 810, to determine a type of a touch event. Then, the processor 810 provides a corresponding visual output on the display panel 861 according to the type of the touch event. In FIG. 8, the touch panel 871 and the display panel 861 implement, as two independent parts, input and output functions of the terminal device. However, in some embodiments, the touch panel 871 and the display panel 861 may be integrated to implement the input and output functions of the terminal device, which is not specifically limited herein.

An interface unit 88 is an interface for connecting an external device to the terminal 80. For example, the external apparatus may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 88 may be configured to receive input (for example, data information or power) from an external apparatus and transmit the received input to one or more elements in the terminal 80 or may be configured to transmit data between the terminal 80 and the external apparatus.

The memory 89 may be configured to store a software program and various data. The memory 89 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 89 may include a high speed random access memory, and may also include a non-volatile memory, such as at least one magnetic disk storage device, a flash memory, or another volatile solid-state storage device.

The processor 810 is a control center of the entire terminal, and connects to various parts of the terminal by using various interfaces and lines. By running or executing the software program and/or module stored in the memory 89, and invoking data stored in the memory 89, the processor performs various functions and data processing of the terminal, thereby performing overall monitoring on the terminal. Optionally, the processor 810 may include one or more processing units. Optionally, the processor 810 may integrate an application processor and a modem. The application processor mainly processes an operating system, a user interface, an application, and the like. The modem mainly processes wireless communication. It may be understood that the foregoing modem may either not be integrated into the processor 810.

The terminal 80 may further include the power supply 811 (such as a battery) for supplying power to the components. Optionally, the power supply 811 may be logically connected to the processor 810 by a power management system, thereby implementing functions such as charging, discharging, and power consumption management by using the power management system.

In addition, the terminal 80 includes some functional module that are not shown, which are not described herein in detail.

Figures 9, 10:
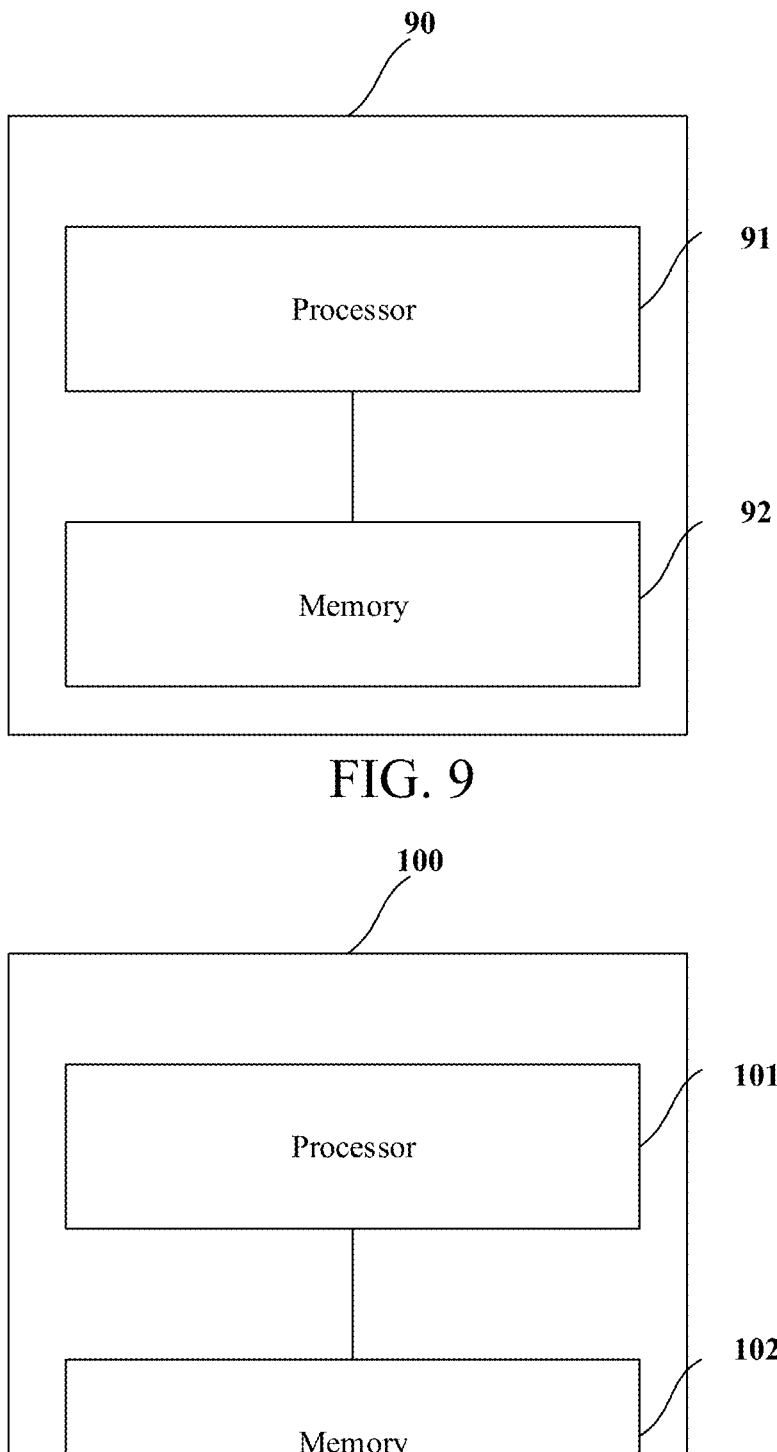
FIG. 9 is a schematic structural diagram of a terminal according to still another embodiment of the present disclosure.
FIG. 10 is a schematic structural diagram of a network side device according to another embodiment of the present disclosure.

Referring to FIG. 9, an embodiment of the present disclosure further provides a terminal 90, including a processor 91, a memory 92, and a computer program stored in the memory 92 and executable on the processor 91, where the computer program, when executed by the processor 91, implements the processes of the embodiment of the bandwidth part activation or deactivation method that is performed by the terminal, or the computer program, when executed by the processor 91, implements the processes of the embodiment of the sidelink connection release method that is performed by the terminal, and the same technical effects can be achieved. To avoid repetition, details are not described herein again.

Referring to FIG. 10, an embodiment of the present disclosure further provides a network side device 100, including a processor 101, a memory 102, and a computer program stored in the memory 102 and executable on the processor 101, where the computer program, when executed by the processor 101, implements the processes of the embodiment of the bandwidth part activation or deactivation method that is performed by the network side device, and the same technical effects can be achieved. To avoid repetition, details are not described herein again.

An embodiment of the present disclosure further provides a non-transitory computer-readable storage medium, storing a computer program, where the computer program, when executed by a processor, implements the processes of the embodiment of the bandwidth part activation or deactivation method that is performed by the terminal, or the computer program, when executed by the processor, implements the processes of the embodiment of the bandwidth part activation or deactivation method that is performed by the network side device, or the computer program, when executed by the processor, implements the processes of the embodiment of the sidelink connection release method, and the same technical effect can be achieved. To avoid repetition, details are not repeated herein. The non-transitory computer-readable storage medium may include a flash drive, a read-only memory (ROM), a random access memory (RAM), a magnetic disk, or an optical disc.

It should be noted that the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that for convenience and conciseness of description, for working processes of the foregoing described system, apparatus and unit, refer to the corresponding processes in the foregoing method embodiments, and details are not described herein.

In the several embodiments provided in this disclosure, it should be understood that the disclosed apparatus and method may be implemented in other manners. For example, the described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

A person of ordinary skill in the art may understand that all or some of the procedures of the methods of the foregoing embodiments may be implemented by a computer program controlling relevant hardware. The program may be stored in a non-transitory computer-readable storage medium. When the program is executed, the procedures of the foregoing method embodiments may be implemented. The storage medium may be a magnetic disc, an optical disc, a read-only memory (ROM), or a random access memory (RAM).

It may be understood that, the embodiments described in the embodiments of the present disclosure may be implemented by using software, hardware, firmware, middleware, microcode, or a combination thereof. For hardware implementation, a module, a unit, and a sub-unit may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in the present disclosure, or a combination of the above.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the foregoing specific implementations, which are merely illustrative rather than limited. Under the inspiration of the present disclosure, a person of ordinary skill in the art can make many forms without departing from the scope of the present disclosure and the protection of the claims, all of which fall within protection of the present disclosure.

What is claimed is:

1. A bandwidth part activation or deactivation method, performed by a terminal and comprising:
   determining to deactivate a sidelink bandwidth part (SL BWP) according to configuration information of a Uu BWP and configuration information of the SL BWP; wherein
   a numerology of the Uu BWP is different from a numerology of the SL BWP; and
   after the determining to deactivate the SL BWP, the method further comprises:
   in a case that an untransmitted medium access control (MAC) protocol data unit (PDU) or an MAC service data unit (SDU) or an MAC control element (CE) still exists for a to-be-released PC5-RRC connection or a released PC5-RRC connection, discarding the MAC PDU or the MAC SDU, or canceling a process corresponding to a discarded MAC PDU.

2. The method according to claim 1, wherein configuration information comprises at least one of following:

a subcarrier spacing (SCS) or numerology;

bandwidth information;

a transmission priority of a channel; or a BWP identifier (ID).

3. The method according to claim 1, wherein a type of the Uu BWP is at least one of following:

an initial downlink BWP;

an initial uplink BWP;

a first activation downlink BWP;

a first activation uplink BWP;

a current activation downlink BWP;

a current activation uplink BWP;

an uplink channel bandwidth of the terminal;

a downlink channel bandwidth of the terminal; or a bandwidth occupied by a control resource set (CORSET) #0.

4. The method according to claim 1, wherein determining to deactivate the SL BWP according to at least one of following configuration information:

a numerology of the Uu BWP is different from a numerology of the SL BWP, or a subcarrier spacing (SCS) of the Uu BWP is different from an SCS of the SL BWP;

a bandwidth of the Uu BWP is within a bandwidth range of the SL BWP;

a bandwidth of the Uu BWP partially overlaps with the bandwidth of the SL BWP; or a transmission priority of a sidelink shared channel is lower than a transmission priority of a physical uplink control channel and/or a transmission priority of an uplink shared channel.

5. The method according to claim 1, wherein after the determining to deactivate the SL BWP, the method further comprises at least one of following:

stopping sending on a physical sidelink broadcast channel;

stopping sending on a physical sidelink control channel;

stopping sending on a sidelink shared channel;

stopping sending on a physical sidelink feedback channel;

stopping monitoring or receiving on the physical sidelink broadcast channel;

stopping monitoring or receiving on the physical sidelink control channel;

stopping receiving on the sidelink shared channel;

stopping monitoring or receiving on the physical sidelink feedback channel;

stopping reporting channel state information;

suspending one or more sidelink configured grant type 1 resources on the SL BWP;

clearing one or more sidelink configured grant type 2 resources on the SL BWP; or releasing one or more PC5-radio resource control (RRC) connections on the SL BWP.

6. The method according to claim 1, wherein a destination identifier (ID) or a connection identifier (ID) corresponding to the MAC PDU belongs to the PC5-RRC.

7. The method according to claim 1, wherein after the determining to deactivate the SL BWP, the method further comprises:

sending the deactivation indication on sidelink or uplink, wherein the deactivation indication comprises at least an SL BWP identifier (ID).

8. The method according to claim 7, wherein in a case that the deactivation indication is sent on the sidelink, the deactivation indication is carried in at least one of following messages:

a broadcast or multicast message;

a PC5-radio resource control (RRC) message;

a medium access control (MAC) control element (CE) message;

a PC5-S message;

a message on a sidelink shared channel (SL-SCH); or a message on a physical sidelink control channel (PSCCH); wherein the message on the PSCCH comprises at least one of following: first-step sidelink control information (SCI) or second-step (SCI).

9. The method according to claim 7, wherein after the sending the deactivation indication on sidelink or uplink, the method further comprises:

stopping sidelink transmission; or after receiving the deactivation confirmation information sent by a peer terminal, stopping the sidelink transmission.

10. A terminal, comprising a processor, a memory, and a computer program stored in the memory and executable on the processor, wherein the computer program, when executed by the processor, implements steps of the bandwidth part activation or deactivation method according to claim 1.

11. A sidelink connection release method, performed by a terminal and comprising:

in a case that a PC5-radio resource control (RRC) connection needs to be released or the PC5-RRC connection is released, and an untransmitted medium access control (MAC) protocol data unit (PDU) or an MAC service data unit (SDU) or an MAC control element (CE) that is related to the PC5-RRC still exists, performing any one of following:

discarding the MAC PDU or the MAC SDU;

canceling a process corresponding to a discarded MAC PDU.

12. The method according to claim 11, wherein a destination ID or a connection ID corresponding to the MAC PDU belongs to the PC5-RRC.

13. A terminal, comprising a processor, a memory, and a computer program stored in the memory and executable on the processor, wherein the computer program, when executed by the processor, implements steps of a sidelink connection release method according to claim 11.

* * * * *